United States Patent
Kaddeche (10) Patent No.: US 9,384,766 B2
(45) Date of Patent: Jul. 5, 2016

(54) APPARATUS, SYSTEMS AND PROCESSES FOR REDUCING A HARD DISK DRIVE'S ACCESS TIME AND CONCOMITANT POWER OPTIMIZATION

(71) Applicant: L2 Drive LLC, Yorba Linda, CA (US)

(72) Inventor: Karim Kaddeche, Irvine, CA (US)

(73) Assignee: L2 Drive LLC, Yorba Linda, CA (US)

( * ) Notice: Subject to any disclaimer, the term of this patent is extended or adjusted under 35 U.S.C. 154(b) by 0 days.

(21) Appl. No.: 15/043,095

(22) Filed: Feb. 12, 2016

(65) Prior Publication Data

US 2016/0163342 A1      Jun. 9, 2016

Related U.S. Application Data (60) Continuation of application No. 14/877,456, filed on Oct. 7, 2015, now Pat. No. 9,293,163, which is a continuation of application No. 14/713,678, filed on May 15, 2015, now Pat. No. 9,190,087, which is a division of application No. 14/529,285, filed on Oct. 31, 2014, now Pat. No. 9,058,825.

(60) Provisional application No. 61/906,015, filed on Nov. 19, 2013, provisional application No. 61/968,540, filed on Mar. 21, 2014.

(51) Int. Cl.
G11B 5/596      (2006.01)

(52) U.S. Cl.
CPC ..................................... *G11B 5/596* (2013.01)

(58) Field of Classification Search
CPC .. G11B 5/5521; G11B 5/5569; G11B 5/4806; G11B 5/54; G11B 5/5526; G11B 5/4886; G11B 5/5578; G11B 21/22
USPC .......................................................... 360/313
See application file for complete search history.

(56) References Cited

U.S. PATENT DOCUMENTS

| | | | |
|---|---|---|---|
| 4,399,477 | A | 8/1983 | Bryer |
| 4,513,332 | A | 4/1985 | Merritt et al. |
| 4,514,837 | A | 4/1985 | Van Rosmalen |
| 4,543,621 | A | 9/1985 | Lindberg et al. |
| 4,631,611 | A | 12/1986 | Schneider |
| 5,223,993 | A | 6/1993 | Squires et al. |
| 6,222,799 | B1 | 4/2001 | Lee |
| 7,146,623 | B2 | 12/2006 | Kuwajima et al. |
| 7,430,091 | B2 | 9/2008 | Manasse |
| 7,760,463 | B2 | 7/2010 | Ward et al. |
| 8,019,936 | B1 | 9/2011 | Hudiono et al. |
| 8,693,126 | B2 | 4/2014 | Buckholdt et al. |
| 2005/0129090 | A1 | 6/2005 | Sheperek et al. |
| 2006/0106980 | A1 | 5/2006 | Kobayashi et al. |
| 2010/0265613 | A1 | 10/2010 | Kim et al. |

FOREIGN PATENT DOCUMENTS

JP      2007-304691      11/2007

OTHER PUBLICATIONS

International Search Report and Written Opinion mailed on Mar. 10, 2015, for International Patent Application No. PCT/US2014/065452, filed Nov. 13, 2014 (12 pages).

*Primary Examiner* — Mark Blouin
(74) *Attorney, Agent, or Firm* — Brown Rudnick LLP (57) ABSTRACT

Rotational latency is reduced in a standard conventional form factor HDD system by replacing, for example, the prior art rotary arm actuator of a conventional HDD, with one or more belts and pulleys and one or more read/write heads mounted on, or otherwise associated with the belts. Multiple scaled iterations facilitate energy savings and power optimized systems, without compromise to data access performance.

20 Claims, 5 Drawing Sheets

FIG. 8

APPARATUS, SYSTEMS AND PROCESSES FOR REDUCING A HARD DISK DRIVE'S ACCESS TIME AND CONCOMITANT POWER OPTIMIZATION

CROSS REFERENCE TO RELATED CASES

This application is a continuation of U.S. patent application Ser. No. 14/877,456, filed Oct. 7, 2015, which is a continuation of U.S. patent application Ser. No. 14/713,678, filed May 15, 2015, now U.S. Pat. No. 9,190,087, which is a divisional application of U.S. patent application Ser. No. 14/529,285, filed Oct. 31, 2014, now U.S. Pat. No. 9,058,825, which claims priority to U.S. provisional patent application Ser. No. 61/906,015, filed Nov. 19, 2013 and 61/968,540, filed Mar. 21, 2014 each of which is expressly incorporated by reference as if fully set forth herein.

FIELD OF THE INVENTIONS

The instant disclosure relates to information technology imperatives and magnetic data storage, along with blue technology, (energy/power optimization systems). Likewise, the present inventions relate to data storage devices and in particular to hard disk drives (HDDs), and apparatus, systems and processes for storing and retrieving digital information and to better facilitate managing the same energy-wise.

BACKGROUND OF THE INVENTIONS

It is respectfully proposed that within technical society, management of data, including generating, storing and accessing the same has become one of the foremost priorities. Technical corollaries to Moore's Law mandate constantly improved ways of improving efficiency of data storage devices. "Kryder's Law" per *Scientific American* (August 2005) suggests that the density of hard drives increases by a factor of 1,000 every 10.5 years (doubling every thirteen years). At a micro-level a need exists at the present time for a simple low-cost method of controlling the position of the read/write heads in information storage systems at the lowest available energy consuming state. This objective remains prominent even as other sustainably initiatives look to be soon accomplished.

A number of different disc drive systems have been available in the market which incorporate, for example, two prime movement sources, of which one supplies continuous rotational motion to the storage disc, and the other supplies. Alternating rotational or linear motion and control and positioning of the read/write head, which are required for selection of storage locations on the disc. Other attempts to gain efficiency have either failed to gain traction in the marketplace or been subject to different challenges.

In today's IT markets, with the proliferation of the use of general and special purpose, there is an ever increasing demand for higher capacity memory devices. The main memory storage device of computers is the hard disk drive (HDD) comprised of a rigid disk, or more typically, a stack of closely spaced rigid disks, with actuator arms carrying tiny magnetic transducer heads being adapted to move radially within such stack of disks in comb-like fashion to record and read magnetically encoded data along circumferential tracks on both faces of all of such superimposed disks, or data platters.

As mentioned, operational constraints currently include the issue that subject computers are built with certain predefined spaces for accommodating the aforedescribed hard disk drive devices, the overall dimensions of such devices, or modules, have been fixed into a small group of discrete package sizes or form factors. Thus increases in the memory capacity of a disk drive module of a given industry standard package size have been made either by increasing the density of the data written on a given area of a disk or by an improved mechanical design, e.g., by providing a greater number of disks in a given package size. That is, prior to the advent of the instant teachings, wherein power may be further optimized within the context of extant form factors.

In addition to maximizing the number of disks in a given package size, various attempts have been made to improve the magnetic head positioning mechanisms, i.e., the actuator arms and the drive arrangements thereof, in order to improve access time, positioning precision, and reading reliability. In prior art mechanisms, several different types of magnetic head positioner mechanisms, or actuator arms, have been developed. Linear positioners generally include a carriage carrying actuator arms which are moved radially with respect to the axis of rotation of the disks in order to position the magnetic heads along various of the circumferentially arranged tracks. Pivotally mounted actuator arms, or rotational positioners, pivot about an axis parallel to the axis of the disk stack so that the magnetic heads carrier at the distal ends thereof are swung in arcuate paths across the magnetically encoded tracks of the disks.

Such pivotally mounted actuator arm assemblies generally include counterbalancing drive arms provided with a voice-coil motor or servo-motor for providing the rotational movement thereto. There has been a continuing search for new and different ways to design such rotational drive mechanisms in order to improve data access time and reading reliability, and various arrangements have been proposed in order to fit within the predescribed form factors and yet provide as efficient and reliable a mechanism as possible. To date, the ongoing search for optimized HDD mechanisms has yet to be completely addressed. Namely, the next paradigm, it is respectfully proposed, has yet to be invented, discovered or commercially implemented, other than by incremental improvements. The present invention is offered for consideration to address these issues and offer solutions to manage the same.

In a conventional actuator arm assembly of the typical prior art hard disk drive devices the actuator arms and the magnetic heads supported thereby are positioned one above the other in a superimposed arrangement so that all of the arms move jointly within the disk stack with the magnetic heads traversing identical super-imposed paths across the opposed faces of the disks. This requires that the spacing between adjacent disks be such as to accommodate a pair of magnet heads, the flexure mountings, and the required supporting arm dimensions.

In recent years, attempts have been made to decrease this required dimension between disks in a stack by offsetting the magnet heads and their flexure mountings between the opposed faces of adjacent disks so that the spacing between disks can be reduced to accommodate just slightly greater than that required for the support arm and a single flexure mounting and its supported magnet head.

There exists an ongoing and longstanding need to lower rotational latency without increasing the speed of the HDD's subject disk(s) or data platters. Numerous approaches have been employed to attempt this, however, the instant teachings, it is respectfully proposed, offer an entirely new approach, constituting—it is respectfully submitted progress in science and the useful arts, and a proper subject matter for U.S. Letters Patent. Since being adopted as the dominant secondary storage device for general purpose computers in the 1960's, HDD's have been continuously improved driving a >$33 billion market this year. Three primary manufacturers, Seagate (Dublin, Ireland), Toshiba (Tokyo, Japan) and Western Digital (Orange County, Calif.) should be considered as sources for any specific part or component of the instant systems. Recording capacity, price per unit storage and product lifetime strongly suggest HDD technology remains an important space for plethoris desiderata. By reducing rotational latency, the present system continues to drive HDD technology past solid-state drives (SSDs) as the once and future secondary storage gold standard.

OBJECTIVES AND SUMMARY OF THE INVENTIONS

The present inventions relate to a new way of mounting and moving read/write heads in a data storage device and in particular in a hard disk drive (HDD), in order to achieve a lower Access Time. This new way lowers the Rotational Latency of the HDD without the need to increase the rotational speed of the HDD's disk(s). If the rotational speed of the HDD's disk also is increased, the invention results in an even greater reduction of the Rotational Latency of the HDD. The invention also allows for the HDD's rotation speed to be reduced, thus lowering power consumption, without loss of data access performance.

According to embodiments there is provided a process for mounting and moving read/write heads within a form factor in proximity to a data surface, whereas rotatably mounting the set of pulleys to a chassis is first accomplished; and whereas the pulleys are rotated by the action of a voice coil and controlled by a controller. The next steps include tensioning a belt around the pulleys and then mounting a plurality of read/write heads on the belt whereas rotation of the pulleys causes the read/write heads to move linearly across the data surface.

Briefly stated, rotational latency is reduced in a conventional form factor compliant HDD system by replacing the existing rotary arm actuator(s) of a conventional HDD with one or more belts and pulleys and one or more read/write heads mounted on, or otherwise associated with, the belt(s).

While the new arrangement for mounting and moving the read/write head(s) in a HDD is drastically different than the current configuration within a conventional HDD (where one or more actuators with the read/write head(s) mounted thereto are used to move the head(s) along an arc and over the surface of a spinning disk), the new head mounting/movement arrangement fits within the existing form factor of a conventional HDD. This makes the innovative head mounting/movement subsystem easy to adopt and incorporate into current HDDs.

According to embodiments, a process for mounting and moving read/write heads within a form factor in proximity to a data surface, which comprises in combination: rotatably mounting a set of pulleys to a chassis, whereby the pulleys are rotated by the action of a voice coil and controlled by a controller; tensioning a belt around the pulleys and mounting a plurality of read/write heads on the belt; and whereby rotation of the pulleys causes the read/write heads to move linearly across said data surface.

The read/write heads are typically mounted on an assembly called a slider. In a conventional actuator arm, the sliders are mounted via a flexible tip of the actuator arm. The flexible tip is calibrated to exert a precise force that balances the force of lift experienced by the slider thus maintaining the slider at the desired flight height. In the present invention, the sliders are mounted to a belt via a short but flexible arm to accomplish the same goal.

It is not necessary to change the size, shape of the outer housing or form factor of a conventional HDD in order to be able to replace the existing actuator/head configuration within the HDD with the new head mounting/movement arrangement. Designers and makers of servers, desktops, laptops, and any other types of computers that use and/or have built-in one or more HDDs do not need to change anything about the current design of those computers to be able to incorporate and use an HDD comprising the new innovative head mounting/movement arrangement.

One aspect of the new innovative head mounting/movement arrangement that differs from a conventional actuator configuration, beyond using one or more belts and pulleys instead of one or more actuators, is how the head(s) in the new arrangement move in straight lines over the surface of a spinning disk. This is in sharp contrast to the conventional rotary actuator configuration in which the end-of-the-actuator-mounted head moves in an arc over the surface of the spinning disk.

Another substantial advantage of the present invention is its mass balance and distribution. Conventional rotary arm actuators suffer from what is commonly known in the industry as Rotational Vibration or RV. In a conventional rotary arm actuator, RV is due to the reaction torque that results from accelerating and decelerating the rotary actuator arm. This torque, centered at the actuator arm bearing, is transmitted through the voice coil to the chassis causing it to vibrate when many I/O operations are executed in rapid succession.

The vibration of the chassis is transmitted to the disk platters in the radial direction, which makes it difficult for the rotary arm actuator to precisely lock on to a single data track on the platters. In the present invention however, the back torque that would inevitably result from the movement of the belt and pulleys is centered on the axis of the spindle and has no radial component making it much less disruptive to tracking. In addition the belt and pulley actuator as a whole, due to their symmetry and mass balance, is much less susceptible to vibrations transmitted to the drive chassis from sources external to the drive itself. External vibrations may cause the belt(s) to vibrate, but are not likely to induce rotary vibration in the pulleys. Several countermeasures can be employed to minimize the vibrations of the belts, while the drive's servo controller can effectively cancel out the effects of belt vibration and keep the read and write heads on track.

DETAILED DESCRIPTION OF THE INVENTIONS

The present inventor has configured an improved HDD system such that the rotational latency of subject disk drives is reduced using a belt and pulley system heretofore uncontemplated. This system is illustrated, explained and claimed below. Reference throughout the specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any schematics and/or flow chart diagrams along with verbal descriptions of steps, included herein are generally set forth as either linguistic or pictorial logical flow chart diagrams. As such, the depicted order and labeled steps are indicative of one embodiment of the presented method. Other steps and methods may be conceived that are equivalent in function, logic, or effect to one or more steps, or portions thereof, of the illustrated systems, processes or methods.

Additionally, any format and/or symbols employed are provided to explain the logical steps of associated systems, processes and methods and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a step is suggested does not indicate that it needs to be performed prior to or after another step unless expressly set forth.

As used herein, the term "data platter" and "disk" are coextensive. The total access time, or Access Time, of a hard disk drive (HDD) is the time it takes to fetch stored information, and it is comprised of Seek Time, Rotational Latency, and Command Overhead, as expressed in the following equation:

Access Time=Seek Time+Rotational Latency+Command Overhead

The Seek Time is the time it takes one or more actuators within the HDD to position one or more read/write heads of the HDD on top of the track to be read, that track being a certain distance away from the storage disk's center. The Seek Time is determined by the power of the HDD's actuator(s) and the inertia (that is, rotating mass) of the actuator(s). The higher the power and the lower the inertia, the lower the seek time.

The Rotational Latency is the average time it takes for the desired sector (that is, the desired portion of the track to-be-read) to rotate and come around underneath the read head. The Rotational Latency is inversely proportional to the speed of rotation of the disk. The average latency, in milliseconds, is determined by dividing 30,000 by the disk's rotation speed in units of rotations per minute (RPM).

The Command Overhead is the time it takes the HDD's electronics to process the I/O request, and this usually is constant at around 0.5 milliseconds.

Currently, typical values for Seek Time can be around 2 milliseconds (ms), while Rotational Latency has "bottomed out" at 2 milliseconds for a 15,000 RPM server HDD, 4.2 milliseconds for a 7200 RPM desktop and up to 5.5 milliseconds for a 5,400 RPM laptop HDD. The lowest Rotational Latency of 2 ms is only achieved at a great expense of energy required to spin the disks at 15,000 RPM. That is, prior to the teachings of the present inventions.

Currently, typical values for Seek Time can be less than 1 millisecond, while Rotational Latency has "bottomed out" at 3 ms for a 10,000 RPM server HDD and up to 5 ms for a 5,400 RPM laptop HDD.

The Rotational Latency is the largest component of the Access Time of a HDD, and it is the most limiting factor on the performance of any HDD. This is a fact that was well known from the early beginnings of disk drive technology, and the typical approach to lowering the Rotational Latency has been to increase the disk's rotational speed. A server HDD currently spins up to 15,000 RPM while a "regular" desktop computer HDD spins at around 7,800 RPM. The cost of increasing the rotational speed of the disk(s) in an HDD is drastically increased energy consumption by the HDD and lower durability and reliability of the HDD.

Expressly incorporated by reference, as if fully set forth herein are the following United States s and publications, and foreign patents—each of which has been reviewed and distinguished form the instant teachings. They are offered herein merely to define the state of the art, and being contemporaneously filed as an information disclosure statement.

By way of example, U.S. No. 8,693,126 (Buckholdt) issued to LSI Corp. uses multiple heads mounted on linear actuators, multiple linear actuators (which terms are used inter-changeably herein) which are located 90° apart around the disks. Notably no belt mechanism is present.

By way of example, and expressly incorporated herein, U.S. Pat. No. 5,223,993, which describes a way of decreasing the access time of a disk drive, namely by using multiple actuators. Said two-actuator design (Conner Peripherals, Inc., San Jose, Calif.) proved to be impractical however because of the increased complexity, power consumption, total manufacturing cost, and physical size of the drive.

Likewise, U.S. Pat. No. 7,430,091 (Manasse) issued to Microsoft Corporation employs dual linear or rotating arm actuators to attempt to achieve lower access time and concomitantly more bandwidth. Once again there is a noted absence of a belt mechanism.

Similarly, distinct from the teachings of the present invention are Matsushita Electric Industries U.S. Pat. No. 7,146, 623 (Kuwujima) wherein the heads, on opposite side of the disk move in unison under the influence of only one same voice coil. Ostensibly problematic would be the rigid linkages which, could result in misalignments, dust and difficulty fitting within a desired form factor.

Legacy or historical attempts to address these issues also have some value, in defining the state of the art, and parcity of improved applications to overcome the science.

By way of further prior art, then state-of-the-art examples U.S. Pat. No. 4,631,611 (Digital Equipment Corporation); U.S. Pat. No. 4,514,837 (U.S. Philips Corporation); U.S. Pat. No. 4,513,332 (Datacopy Corporation) and U.S. Pat. No. 4,399,477 (Bryer) each further document evolution of system to address important issues.

Schneider's '611 patent replaces an actuator arm by two pulleys (to avoid "head skew" or rotation of the head with respect to the data tracks) one fixed to the other and rotating around to axes to maintain the head parallel to itself through the motion of the actuator.

Van Rosmalen's '837 patent shows a read/write objective mounted on a carrier by means of rollers and rail, whereby a belt links the subject motors to the carrier and counter masses—and the entire actuator is mounted on one side of the disk.

Maccill's '332 patent shows heads mounted on a rotary arm actuator itself actuated by a wire. Similarly, Beyer's '477 patent shows the head being supported by a guide, wherein the subject half is only used to convert rotation of a stopper motor into linear motion of the subject heads.

The present invention aims to reduce the Rotational Latency of a disk drive by employing one or more read/write heads mounted on a system of one or more belts and pulleys. Each belt suspends one or more read/write heads in proximity of the data platter's (i.e., the disk's) surface, and in this way the head(s) can be moved radially across the platter(s). When a certain track and sector is requested, a drive controller can select to fulfill the I/O request using the read/write head(s) closest to the requested position that needs to be read.

According to embodiments, one or more pulleys are driven by one or more voice coils and are controlled by one or more controllers, but because each belt can carry one or more read/write heads even a single driving voice coil controlled by a single controller can accomplish the job of multiple conventional actuators without the associated expense and complexity of using multiple conventional actuators.

Figure 1:
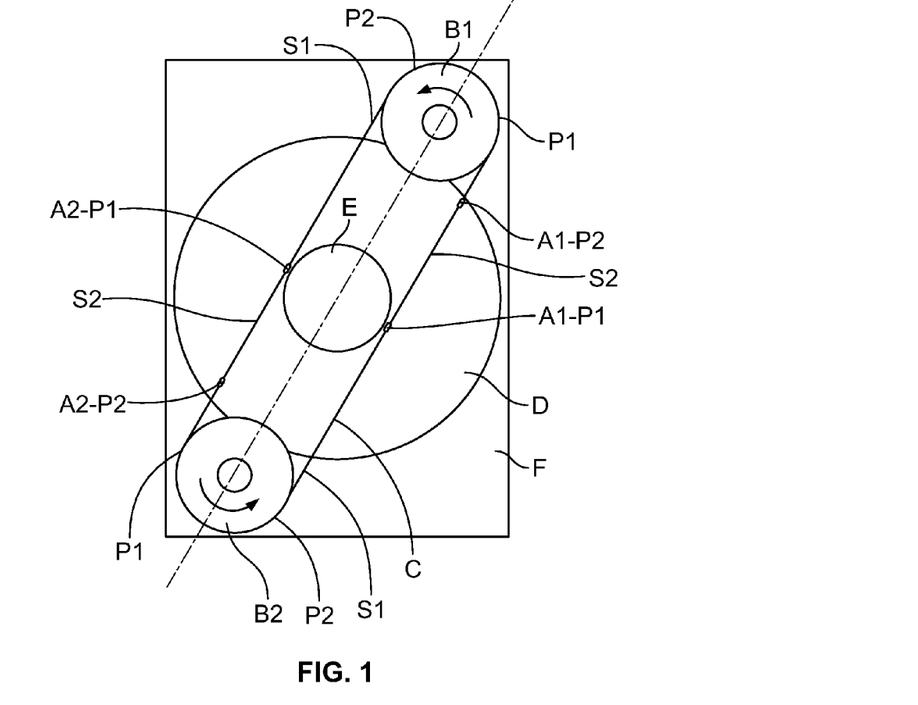
FIG. 1 is a schematic showing embodiments according to teachings of the present invention.
Figure 2:
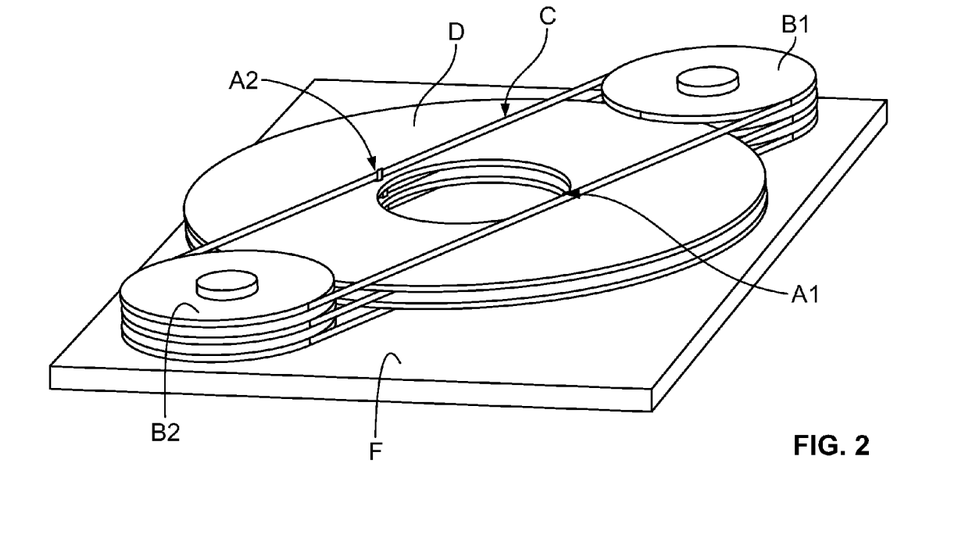
FIG. 2 is a schematic showing embodiments according to teachings of the present invention.

FIGS. 1 and 2 show an embodiment of the invention using two sets of read/write heads (A1 and A2) to effectively halve the rotational latency. The main pulleys (B1 and B2) are rotatably mounted to the chassis (F) and, just as with a conventional actuator arm, are rotated by the action of a voice coil (not shown in FIGS. 1 and 2) and controlled by the drive's controller (not shown in FIGS. 1 and 2). The read/write heads (A1 and A2) are mounted on the belts (C) and are at their inner most position (A1-P1 and A2-P1) when the pulleys (B1 and B2) are at the P1 position. When the pulleys B1 and B2 rotate, in FIG. 1, counter clockwise, from position P1 to position P2, the read/write heads will move outwards to their P2 position (A1-P2 and A2-P2).

In all angular positions of the pulleys B1 and B2, the two sets of heads are positioned, essentially, at the same distance from the center of rotation of the drive platters and are therefore ready to read from opposite sides of the same data track. For typical drive dimensions, it can be determined by calculation that, in order for the heads to cover the full distance from position P1 to position P2, the main pulleys B1 and B2 would NOT have to turn more than 150°; for this reason, and in this configuration, the belt C can be rigidly connected or coupled to each of the pulleys B1 and B2. The 150° sweep angle for pulleys B1 and B2 is much wider than the typical sweep angle for a conventional actuator which is typically around 30°. The larger sweep angle is an advantage because it means the Belt and Pulley actuator will have a lower track resolution (number of tracks/sweep angle), this in turn will enable the Belt and Pulley Actuator to better resolve the higher track densities necessary for higher capacity drives.

Figure 3:
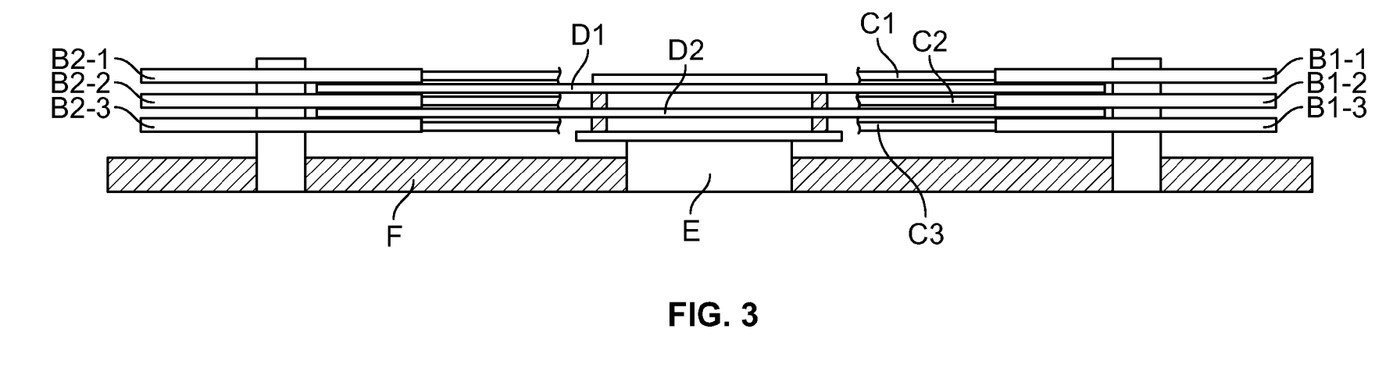
FIG. 3 is a cross-sectional cut-away view of embodiments according to teachings of the present invention.

FIG. 3 shows a cut-away, cross-sectional view of the same disk drive configuration depicted in FIGS. 1 and 2. In this disclosed embodiment of the invention, the drive is using two data platters (D1 and D2). In order to read and write from all 4 surfaces of the platters (that is, top and bottom of D1 and top and bottom of D2), three belts (C1, C2 and C3) and two sets of three pulleys are used. Pulley set one uses three pulleys (B1-1, B1-2, B1-3), and pulley set two uses three pulleys (B2-1, B2-2, B2-3). The drive uses a total of 8 heads, two per platter surface. Each of belts C1 and C3 carries two heads, while the middle belt, C2, carries a total of 4 heads. The read/write heads are not shown in FIG. 3.

Figure 4:
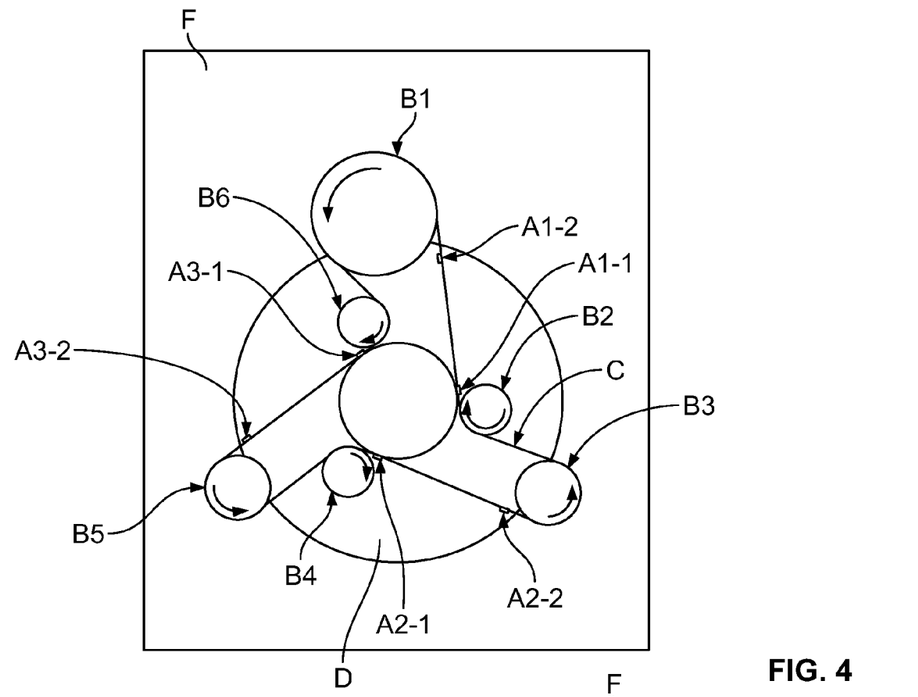
FIG. 4 is a schematic showing embodiments using three sets of read/write heads according to teachings of the present invention.

FIG. 4 shows another embodiment of the present invention. This embodiment uses three sets of read/write heads (A1, A2 and A3), effectively reducing by a factor of 3 the Rotational Latency. When the main pulley B1 rotates counter-clockwise, the heads move in unison from position 1, at the inner most diameter (A1-1, A2-1 and A3-1), to position 2 at the outer most diameter (A1-2, A2-2 and A3-2).

Figure 5:
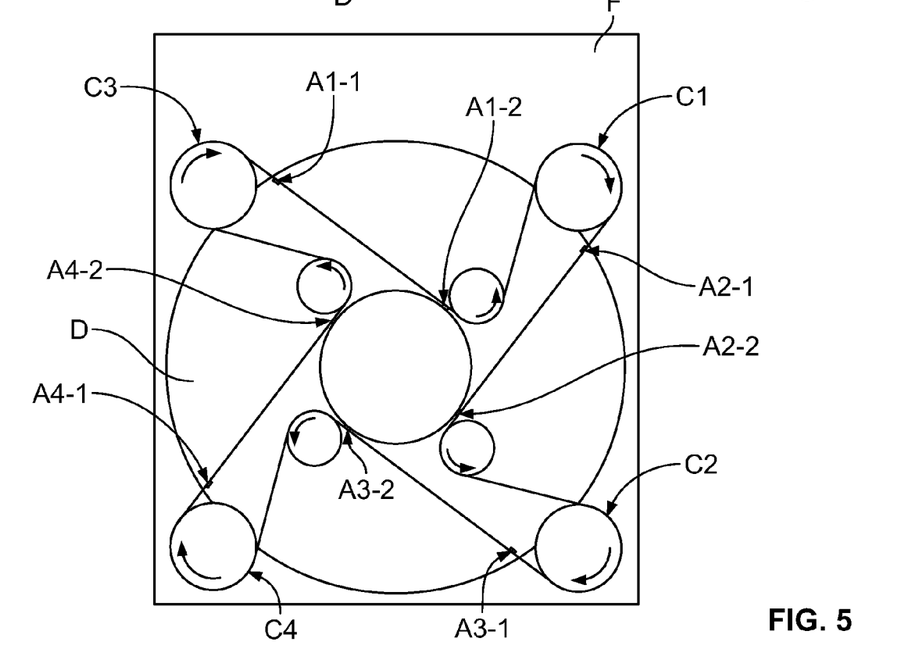
FIG. 5 is a schematic showing embodiments using four sets of read/write heads according to teachings of the present invention.

FIG. 5 shows another embodiment of the invention where a drive using 4 sets of read/write heads (A1, A2, A3 and A4) would have a Rotational Latency that is one fourth that of a conventional disk drive rotating at the same RPM.

Those skilled in the art understand that voice coils, as used in conventional systems, function within the context of the instant systems. For example, in each of the embodiments shown in FIGS. 1 through 5, the driving pulleys, for example B1 or B2 in FIG. 1, can make use of a voice coil apparatus similar in design to those used in commercially available disk drives. A conventional voice coil motor as used in a current HDD likewise adaptable by artisans to achieve the wider angle of rotation and/or movement increments required by the disclosed embodiments of the invention. In a conventional HDD, the voice coil is the motor that moves the actuator, under the control of the HDD's controller. The conventional HDD voice coil may need to be adapted to cover a wider angle of rotation to make it suitable for use in the new innovative HDD head mounting/movement arrangement according to the invention.

Similarly, those of skill readily understand that according to the instant teachings, each of the belts can be made from a strip of steel or can be made out of a composite material. Other types of materials are possible for the belts. In the case of a belt made of a composite material, the belts can be multi-layered with reinforcing fibers. Electrical conducting leads can be affixed to the outer surface of the belts, or sandwiched between layers of the belts, to conduct electrical power to and data signals to and from the read/write heads.

The belts can have a variety of cross-sections, but whatever the particular cross-section configuration of the belts, the belts are designed to maintain optimal positioning while minimizing friction and wear and tear on the belts. In order to maintain the proper tension on the belt, at least one pulley or pulley group, would have to be mounted to the chassis on a tensioning mechanism. Other conventional designs for a belt tensioner can be adapted to the present invention.

Dampers can be mounted at various locations along the belt, as well as the pulleys, in order to damp out and minimize vibrations. These dampers can be composed of an outer shell with a cavity filled with a viscous fluid and sealed. The shell cavity also contains a free-floating weight. When the outer shell, that fixed to the belt or a pulley is subjected to vibration, the inner free-floating weight will shake and the viscous fluid will shake around it dissipating some of the vibration's energy in the form of heat in the fluid. These types of dampers are usually referred to as "tuned mass dampers), also known as harmonic absorbers.

The free resonance frequency (FRF) of the belt and mounted read/write head assemblies is a function of the tension of the belt, the weight of the head assemblies and the rigidity of the belt itself. In order the keep the FRF at a much higher level than other frequencies typically encountered in an HDD environment, the belt tension needs to be as high as possible without causing the deterioration of the pulley bearing life, the mass of the Head Gimbal Assemblies (the HGAs) need to be kept to a minimum and the belt needs to be made as rigid as possible.

To achieve this last criterion, it is possible to use a completely rigid straight component in portions of the belt that never wrap around the pulleys. In FIG. 1, this would be parts of the belt between S1 and S2, and between S1 and S2. To further increase the rigidity of the belt, in the portions that have to remain flexible in order to wrap around the pulleys, it is possible to use an induced "C" cross-section in the belt similar to the cross-section of a household measuring tape. The "C" cross-section adds a high level of rigidity in the belt while allowing the belt to flatten out in order to wrap around the pulleys. However, the "C" cross-section is asymmetrical and has more strength in one direction than the other. In order to enhance rigidity in the weak direction it would be beneficial to induce a preload in the weak direction using a spring wire mounted along the center line of the belt.

One or more Accelerometers can be mounted on the belt to sense the vibration phase of the belt. The signal from the accelerometer can be fed to the servo controller, along with the Position Signal and the Position Error Signal (PES), to determine the necessary movement of the actuator to keep the slider on the desired data track.

Due to the tension in the belt(s), the pulley bearings will be subjected to a high radial load. This radial load may cause stiction in the bearings. For this reason the number of roller bearings per pulley might have to be increased in order to spread the radial load. Alternatively, a hydrodynamic bearing could be used to support the pulleys. This bearing however, will not have sufficient speed to generate a high enough hydrodynamic pressure for correct operation. Therefore an external source of hydraulic pressure will be necessary. To this end, high-pressure hydraulic fluid can be supplied from the disk spindle motor which will need to be adapted to produce such a high pressure hydraulic fluid either by attaching a hydraulic pump or by bleeding off a portion of its own hydraulic fluid. In either case, a hydraulic circuit will be established between the spindle bearing and the actuator bearing(s). A portion of this hydraulic circuit can be built right into the chassis.

To this end, high-pressure hydraulic fluid can be supplied from the disk spindle motor which will need to be adapted to produce such a high pressure hydraulic fluid either by attaching a hydraulic pump or by bleeding off a portion of its own hydraulic fluid. In either case, a hydraulic circuit will be established between the spindle bearing and the actuator bearing(s).

Those skilled in the art will also understand how to mount sliders to the belts, in that the read/write heads are typically manufactured as one unit called a slider. In a conventional actuator arm, each slider is mounted via a flexible tip of the actuator arm called a flexure that allows it to swivel. The load arm is calibrated to exert a precise down force that balances the force of aerodynamic lift experienced by the slider thus maintaining the slider at the desired flight height.

Figure 6:
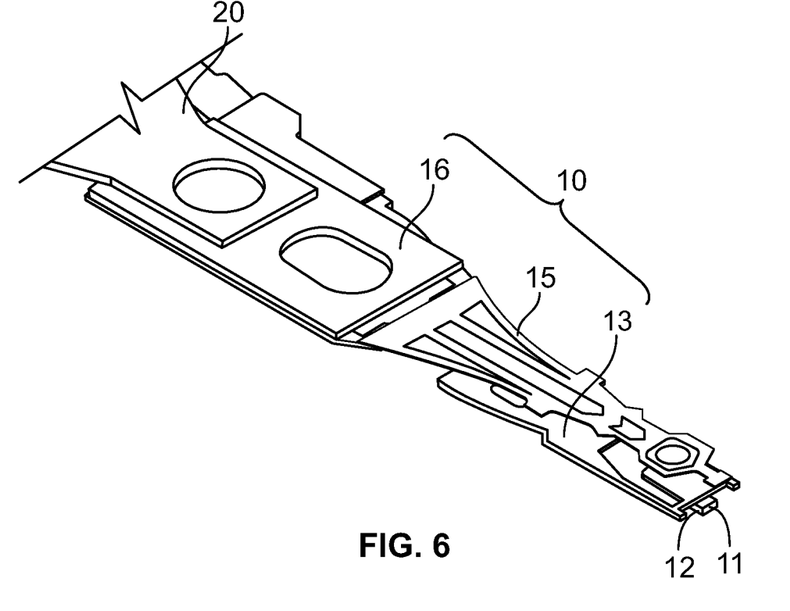
FIG. 6 is a schematic showing a conventional Head Gimbal Assembly (HGA) according to teachings of the present invention.
Figure 7:
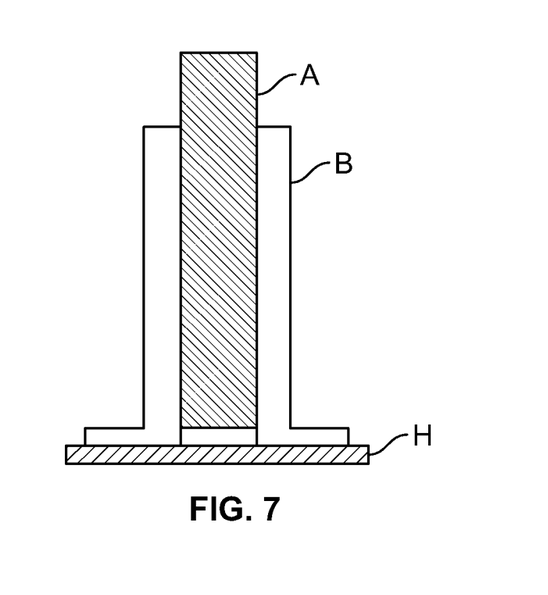
FIG. 7 is a schematic showing a cross sectional view of a mounting a head gimbal assembly to a belt using two angle brackets, according to teachings of the present invention.

The slider, flexure and load arm are together called the Head Gimbal Assembly (HGA). In the present invention, the HGA(s) can be directly attached to the belt at their base by using angle brackets (FIG. 7). FIG. 6 shows a typical HGA where 12 is the slider, 11 is the reading head, 13 is the flexure, 15 is the load beam, and 16 is the base plate. Collectively, 16, 15 13 and 12 are called the HGA. Element 20 is the E-Block of a conventional rotary arm actuator. FIG. 7 shows a cross-sectional view of one way to mount an HGA to the Belt using two angle brackets.

In FIG. 7, A is the cross-section of the belt, B is a mounting bracket, and H is the base plate of an HGA viewed on edge.

Figure 8:
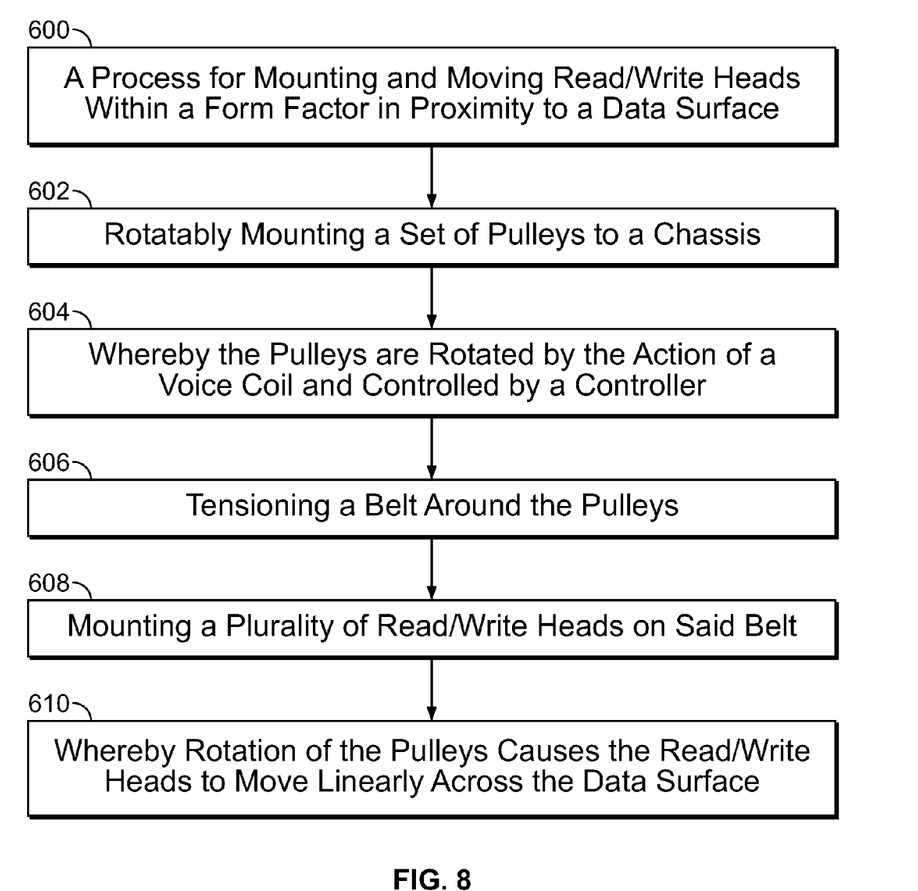
FIG. 8 is a flow chart depicting operations according to according to teachings of the present invention.

Referring now to FIG. 8, an overall summary of applicant's improvements to extant processes in HDD is offered for consideration. What applicant has invented, it is respectfully proposed, relates to 600 a process for mounting and moving read/write heads, within a conventional form factor, in proximity to a data surface.

An initial step 602 may be rotatably mounting a set of pulleys to a chassis. This likewise inherently includes the state whereby the pulleys are rotated in the action of a voice coil and controlled by a controller. Since this is conventional and known further description is omitted (they are available from Seagate, Toshiba and Western Digital of Orange County, Calif. 92692). A substantive step 606 involves tensioning a belt around said pulleys. As discussed, this further refines the instant teachings. Step 608 includes mounting a plurality of read/writes on said belt, again 610 is whereas rotation of the pulleys cases read/write heads to move linearly across the data surface.

Those skilled in the art likewise understand the utility of a parking ramp, as discussed herein. At disk startup and shutdown, the sliders should be "parked" away from the surface of the data platters and should not be allowed to contact those surfaces while the platters are not spinning at an RPM sufficient to generate enough lift to "fly" the sliders at the required height. For this purpose, the vast majority of drives currently on the market use what is called "parking ramps" positioned towards the outer edges of the platters. These wedge shaped ramps cause the sliders to be lifted away from the platter surface when the actuator is in the outmost position. The present invention uses such ramps.

Those of skill in the art likewise are well aware of how to transmit signals to the read/write heads. In order to carry signals, and electrical power, to and from the read/write heads, conductive leads must run from the heads to the drive controller. This is commonly referred to as the signal path. These leads can be embedded inside or bonded to the belts carrying the heads. Since each of the belts preferably is connected or coupled to its pulley(s) at a fixated point on the pulley, those leads can contact additional leads embedded within or carried by the pulleys. Because the pulleys only rotate for an angle of + or −75°, in one particular preferred embodiment, a flexible strip can be adapted to connect the pulleys to the drive controller mounted on the frame of the drive. That is, the pulleys preferably do not rotate completely around and ideally rotate much less than 360°.

Conventional actuator arms can carry primary signal processing circuitry (including or such as pre-amplifiers) mounted directly to the arm; similarly, in the present invention, any such circuitry can be mounted on or embedded into one or more pulleys.

In order to avoid interference from the voice coil driving one of the pulleys, the signal wires can be routed through the pulley that is furthest from the voice coil.

In certain configurations where the pulleys are required to turn through a wider angle, it might be necessary to use electrically conducting brushes to convey signals and electrical power between the pulleys the drive controller affixed to the frame of the drive.

Alternatively, or in addition, one or more signals can be transmitted wirelessly, such as over a very short distance between a pulley and a received mounted on the frame of the drive.

For configurations using 3 or 4 sets of read/write heads, such as those depicted in FIGS. 4 and 5, those skilled in the art readily understand how and why it is necessary to use intermediate guide pulleys (B2, B4 and B6 in FIG. 4) near the inner diameter of the platters. These pulleys orient and position the belt so that the read/write heads can reach the inner most tracks of the data platters. In drives using more than one data platter, these guide pulleys must be suspended in the space between two platters. One or more thin wedge shaped support elements can be adapted to carry the guide pulleys on one end and solidly mount to the drive frame without interfering with the belts, the data platters, or other pulleys. These support elements would be very similar in shape and constructions to the Shrouds used in many commercially available disk drives to minimize turbulent airflow near the outer edges of the platters. A thin wedge shaped element can be adapted to carry the guide pulley on one end and solidly mount to the drive on its longest edge, without interfering with the belts, the data platters, or other pulleys.

Additionally, the present invention uses second stage actuation, optionally to optimize performance. The belts can maintain the read/write heads at essentially the same distance from the center of rotation of the platters, however, due to practical manufacturing tolerances, differential heat expansion of all drive parts, and the extremely high track densities used by today's drives, it is virtually impossible for any simple actuator to position two heads on exactly the same track at all times. Therefore, the use of a second stage actuator may be necessary to achieve maximum performance. Many drives currently on the market make use of a second stage actuator, usually a piezoelectric micro-mechanical device, for precise adjustments of the read/write heads position as well as seeking to adjacent tracks. The present invention can make use of either an electro static, electro magnetic or piezoelectric type of second stage actuators as currently on the market to achieve the goal of positioning two or more read/write heads on the same track or cylinder (and for seeking to adjacent tracks within their range of motion.) The same type of second stage actuators as currently on the market can be used by the present invention to achieve the goal of positioning two or more read/write heads on the same track or cylinder (and for seeking to adjacent tracks within their range of motion). The SSAs are also useful for compensating for position errors due to belt vibration and disk wobble.

Likewise, artisans understand why reading from multiple heads simultaneously is advantageous within the context of the instant teachings. To achieve the maximum potential and benefit of the current invention, it is highly desirable to read from multiple heads simultaneously. In older disk drive designs, heads that could be read from and written to simultaneously where called a "head group." In FIG. 4, for example, the head group count would be three (A1, A2, and A3), while in FIG. 5 the head group count would be four (A1, A2, A3, A4). Once a seek operation to a certain track has been achieved, and since we now have more than one head positioned on the desired track, the read or write operation can proceed in parallel using all the positioned heads thus effectively multiplying the read and write speeds by the number of heads used. The head group does not have to be limited to heads on the same surface but can include heads on multiple surfaces. However, this goals of reading from multiple heads simultaneously might only be possible through the use of a second stage actuator for each read/write head.

Sector interleaving is also important. Sectors on a track are usually numbered sequentially around the track. Since embodiments of the present invention use multiple heads per surface, it can be advantageous to separate two logically sequential tracks by an angle approximately equal to 360° divided by the number of heads per surface. In this way, read/write operations on a series of logically adjacent sectors can be performed in parallel by all the available heads. Other physical to logical mappings are possible to take advantage of the plurality of heads per recording surface.

The main drive motor (at the center of the platters which sometimes is not shown) and the data platters themselves are preferably left untouched by the present invention and remain the same as found in a conventional HDD unit. Instead, it is the actuator arm that is replaced by the innovative system of pulleys and belts. Except in one embodiment, the drive motor can be used as a source of high pressure hydraulic fluid to feed one or more hydro dynamic bearing.

The drive controller is a set of electronic circuitry that is essentially the brain of the disk drive. It interfaces with the host computer and buffers data to and from the host computer. In a conventional HDD unit, it prioritizes and translates read/write requests into lower level signals for controlling the actuator and regulates the rotation of the drive spindle. In the present invention, the controller has to be adapted to take into account the replacement of the conventional actuator configuration with the new innovative Belt and Pulley arrangement, and if necessary, upgraded with the capability to read and write from multiple heads simultaneously.

While methods, devices, compositions, and the like, have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims. It is understood that the term, present disclosure, in the context of a description of a component, characteristic, or step, of one particular embodiment of the disclosure, does not imply or mean that all embodiments of the disclosure comprise that particular component, characteristic, or step.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC §132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive forms so as to afford the applicant the broadest coverage legally permissible.

What is claimed is:

1. An apparatus comprising a belt, a pulley, a read/write head, and a data recording medium, the belt and the pulley configured to suspend the read/write head over a surface of the data recording medium and to move the read/write head linearly across and above the surface upon movement of the pulley.

2. The apparatus of claim 1 further comprising a slider, the read/write head being coupled to the slider.

3. The apparatus of claim 2 further comprising a head gimbal assembly (HGA) attached to the belt, the HGA comprising the slider.

4. The apparatus of claim 1 further comprising a chassis, a voice coil, and a controller, the pulley rotatably mounted to the chassis and rotated by action of the voice coil, the voice coil controlled by the controller.

5. The apparatus of claim 4 wherein the chassis is configured to fit within a form factor of a conventional hard disk drive (HDD).

6. The apparatus of claim 1 further comprising a plurality of belts, pulleys, read/write heads, and data recording mediums.

7. The apparatus of claim 1 further comprising a plurality of data recording mediums.

8. The apparatus of claim 7 further comprising a plurality of read/write heads, at least one of the read/write heads for each of the data recording mediums.

9. The apparatus of claim 8 wherein each of the plurality of read/write heads is configured to read simultaneously from its respective data recording medium.

10. A mounting and moving system for read/write heads in a data storage device, the system comprising a hard disk drive (HDD), the HDD further comprising a belt, a pulley, a data recording surface and a read/write head, the belt and pulley configured to suspend the read/write head over the data recording surface and move the read/write head linearly across the data recording surface upon rotation of the pulley.

11. The mounting and moving system of claim 10, further comprising a slider, wherein the read/write head is coupled to the slider.

12. The mounting and moving system of claim 11, further comprising a head gimbal assembly (HGA), the HGA comprising a flexure, the slider, and a load arm.

13. A data storage device comprising a belt disposed around at least one pulley, the belt and at least one pulley configured to suspend a head gimbal assembly over a data recording surface and move the head gimbal assembly linearly across the data recording surface upon rotation of the at least one pulley.

14. The device of claim 13 wherein the assembly comprises a slider.

15. The device of claim 14 wherein the assembly further comprises a flexure and a load arm.

16. The device of claim 13 wherein the head gimbal assembly comprises a read/write head.

17. The device of claim 13 further comprising a chassis, the pulley rotatably mounted to the chassis.

18. The device of claim 13 comprising a plurality of data recording surfaces.

19. The device of claim 18 comprising a read/write head for each of the plurality of data recording surfaces.

20. The device of claim 19 wherein the plurality of read/write heads are configured to read from a data track simultaneously.

* * * * *